United States Patent

Hirmer

[11] Patent Number: 5,830,397
[45] Date of Patent: Nov. 3, 1998

[54] METHOD OF MAKING A VEHICLE WINDOW

[75] Inventor: Gerhard Hirmer, Aurora, Canada

[73] Assignee: Decoma International Inc., Concord, Canada

[21] Appl. No.: 848,233

[22] Filed: Apr. 29, 1997

Related U.S. Application Data

[60] Continuation of Ser. No. 447,542, May 24, 1995, abandoned, which is a division of Ser. No. 327,684, Oct. 24, 1994, Pat. No. 5,525,401.

[51] Int. Cl.⁶ .......................... B29C 45/14; B29C 45/16
[52] U.S. Cl. .......................... 264/132; 264/265; 264/267
[58] Field of Search ..................................... 264/267, 265

[56] References Cited

U.S. PATENT DOCUMENTS

| | | | |
|---|---|---|---|
| 3,414,417 | 12/1968 | Miller et al. | 264/132 |
| 3,898,427 | 8/1975 | Levin et al. | |
| 4,128,448 | 12/1978 | Bitterice et al. | 156/166 |
| 4,361,751 | 11/1982 | Criss et al. | 219/522 |
| 4,732,725 | 3/1988 | Moncheaux et al. | 264/135 |
| 4,917,927 | 4/1990 | Sakaitani et al. | 264/132 |
| 5,419,088 | 5/1995 | Raymond et al. | 52/1 |

FOREIGN PATENT DOCUMENTS

| | | |
|---|---|---|
| 238164 A1 | 1/1987 | European Pat. Off. |
| 604750 A1 | 11/1993 | European Pat. Off. |
| 1165168 | 5/1958 | France . |
| 0353140 | 7/1988 | France . |
| 2633880 | 7/1989 | France . |
| 3506011 A1 | 2/1985 | Germany . |
| 2041011 | 2/1987 | Japan . |
| WO 94/05524 | 3/1994 | WIPO . |

*Primary Examiner*—Jan H. Silbaugh
*Assistant Examiner*—Edmund H. Lee
*Attorney, Agent, or Firm*—Cushman Darby & Cushman IP Group of Pillsbury Madison & Sutro, LLP

[57] ABSTRACT

A vehicle window including a relatively thin sheet of clear plastic material having opposed surfaces, an electrically operable defrosting grid adhered to one surface of the relatively thin sheet, and a relatively thick substrate layer of clear plastic material having opposed surfaces curved into a vehicle window configuration. The relatively thick substrate layer is adhered to the one surface of the relatively thin sheet and the electrically operable defrosting grid adhered thereto while in contact therewith in a molten state under heat and pressure within a cavity defined by two generally parallel curved die surfaces of cooperating injection molding dies so that upon solidification the surfaces of the relatively thin sheet are retained in a curved configuration in generally parallel coextensive relation to corresponding curved surfaces of the relatively thick substrate layer and a method of making the window wherein the electrically operable defrosting grid is formed by silk screening onto one surface of the relatively thin sheet while in a substantially planar condition a curable electrically conductive ink in the form of a defrosting grid and then curing the curable electrically conductive ink on the one surface of said relatively thin sheet so that the defrosting grid is stably adhered thereto.

11 Claims, 1 Drawing Sheet

METHOD OF MAKING A VEHICLE WINDOW

This is a continuation of application No. 08/447,542, filed on May 24, 1995, which was abandoned upon the filing hereof; which in turn is a divisional of Ser. No. 08/327,684, filed Oct. 24, 1994, now U.S. Pat. No. 5,525,401.

This invention relates to windows and more particularly to windows having electrical defrosting grids embodied therein such as the rear windows of motor vehicles.

Motor vehicle designs particularly for passenger vehicles require a great latitude in the curvatures which are considered desirable from a design standpoint and often such curvatures are desired in the windows provided. Recent designs have more and more gone to the round look at the front and rear ends of the car. Particularly, in rear windows where defrosting is of great importance, the curvatures desired are becoming greater and greater. A cost problem in producing severely curved rear windows is in embodying the electrical resistance heating elements in the final product because heretofore it has not been possible to utilize the more cost effective silk screening methods to provide the heating elements because of the necessity to silk screen onto an essentially flat surface.

It is well known that glass has been the material of choice in motor vehicle rear windows for many years. It is also well known that plastic materials, such as polycarbonates, if employed in lieu of glass, could reduce the weight of the rear window. Nevertheless, glass continues to be used. It is apparent that, in order for motor vehicle makers to shift from glass to plastics, the plastic window must be cost effective in other ways besides weight reduction.

One way in which additional cost effectiveness can be achieved relates to the way the electrical defrosting system is embodied in the window construction. For example, it would be desirably effective to have the electrical grid quite close to the exterior surface but still protected by being mounted inwardly of the exterior surface. With an arrangement of this type, the electrical grid can be made to effectively operate with less power requirement with the resultant advantages in the characteristics and amount of conductive material needed to provide the system.

It is an object of the present invention to provide a vehicle window which meets the cost effectiveness requirements set forth above. In accordance with the principles of the present invention, this objective is achieved by providing a vehicle window which comprises the combination of three components: one, a thin clear sheet; two, an electrically operable defrosting grid; and three, a relatively thick clear substrate layer. The relatively thin clear sheet is of a plastic material having opposed surfaces. The electrically operable defrosting grid is adhered to one surface of the thin sheet. The relatively thick clear substrate layer is of a plastic material having opposed surfaces curved into a vehicle window configuration. The relatively thick substrate layer is adhered to the one surface of the relatively thin sheet and the electrically operable defrosting grid attached thereto while in contact therewith in a molten state under heat and pressure within a cavity defined by two generally parallel curved die surfaces of cooperating injection molding dies so that, upon solidification, the surfaces of said relatively thin sheet are retained in a curved configuration in generally parallel coextensive relation to corresponding curved surfaces of said relatively thick substrate layer.

The provision of the thin clear sheet as a basic component of the window enables the particularly cost effective silk screening process to be used in making the window because the relatively thin sheet can have the silk screening of the grid performed while in a planar condition and then subsequently curved during the injection molding of the relatively thick substrate layer. Accordingly, another object of the present invention is to provide a method of making a window which can have fairly severe curvatures in two planes sufficient to accommodate a wide variety of designs having an electrical defrosting system which is provided by a conventional silk screening process. In accordance with the principles of the present invention, this objective is achieved by providing a method of forming a window which comprises providing a relatively thin sheet of clear plastic material having opposed surfaces and silk screening onto one surface of the relatively thin sheet while in a substantially flat planar condition a curable electrically conductive ink in the form of a defrosting grid. The curable electrically conductive ink is cured on the one surface of the relatively thin sheet so that the defrosting grid is stably adhered thereto. The relatively thin sheet with the defrosting grid adhered to one surface thereof is mounted adjacent a curved die surface of a molding die arranged to be disposed in cooperating relation with a second molding die having a similarly shaped curved die surface. The first and second molding dies are disposed in cooperating relation so as to bring the two curved die surfaces into generally parallel relation to form a die cavity with a spacing between the two curved die surfaces substantially greater than the thickness of the thin sheet. Finally, a clear plastic material is injection molded under heat and pressure within the die cavity between the two generally parallel curved die surfaces so as to form a window having curved exterior surfaces comprising a curved relatively thin clear sheet having the electrically conductive grid adhered to one surface thereof and a relatively thicker substrate layer of clear plastic molded in adhered relation to the relatively thin clear sheet.

Another object of the present invention is the provision of a vehicle window which comprises a relatively thin sheet of clear plastic material having opposed surfaces, an electrically operable defrosting grid adhered to one surface of the relatively thin sheet, and a relatively thick substrate layer of clear plastic material having opposed surfaces curved into a vehicle window configuration. The relatively thick substrate layer is adhered to one surface of the relatively thin sheet and the electrically operable defrosting grid adhered thereto while in contact therewith in a molten state under heat and pressure within a cavity of an injection molding device so that upon solidification the surfaces of the relatively thin sheet are retained in a curved configuration in generally parallel coextensive relation to corresponding curved surfaces of the relatively thick substrate layer.

These and other objects of the present invention will become more apparent during the course of the following detailed description and appended claims.

The invention may best be understood with reference to the accompanying drawings wherein an illustrative embodiment is shown.

Figure 1:
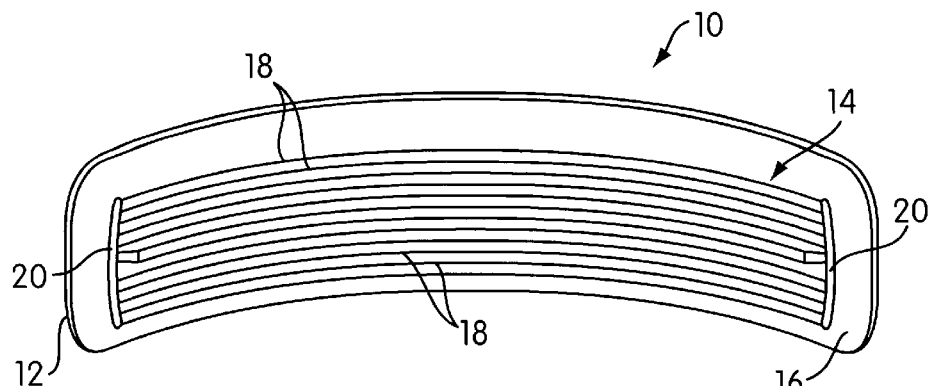
FIG. 1 is a perspective view of a vehicle rear window constructed in accordance with the principles of the present invention.

Referring now more particularly to the drawings, there is shown in FIG. 1 a vehicle window, generally indicated at 10, which embodies the principles of the present invention. The window consists essentially of three components: a relatively thin sheet of clear plastic material 12, an electrically operable defrosting grid, generally indicated at 14, and a relatively thick substrate layer of clear plastic material 16.

The relatively thin sheet 12 is formed from any suitable thermoplastic material. Preferred materials are taken from the group consisting of polycarbonate or polyester resin, with polycarbonate being a preferred embodiment. The relatively thin sheet 12 may be formed by any appropriate method, such as extrusion or molding. The relatively thin sheet 12 has a thickness within an operative range of 5 to 40 mils and a preferred range of 10 to 30 mils. A preferred thickness for the relatively thin sheet 12 is approximately 20 mils.

The electrically operable defrosting grid 14 is of conventional form including a series of parallel wire-like elements 18 and a pair of buss bars 20 at opposite ends thereof. In the broadest aspects of the present invention, grid 14 may be formed in any suitable manner from any suitable conductive material. However, in a preferred embodiment, the defrosting grid 14 is formed by a conductive material in the form of an ink applied to one surface of the thin sheet 12 through a silk screen. The ink is subsequently cured by heat. It will be understood, however, that the ink may be an ink which is capable of being cured by exposure to ultraviolet light or other means. A preferred example is epoxy material loaded with silver particles which is cured by heat in accordance with conventional practice.

It will also be understood that the silk screening process which is utilized for applying the electrically operable defrosting grid 14 to one surface of the thin sheet 12 can also be utilized to provide the thin sheet with a border of black material provided by loading the epoxy material with carbon particles rather than the silver particles, all in accordance with conventional silk screening practice.

It is also possible to provide the surface of the thin sheet 12 opposed to the surface which receives the electrically operable defrosting grid 16 with an abrasive resistant coating. The coating is applied before the silk screening process and preferably by a dipping procedure. This preferred procedure has the effect of coating both surfaces of the relatively thin sheet 12. Where the one surface which is to receive the silk screening material is provided with an abrasive resistant coating, the coating serves to enable the silk screening inks to adhere more tenaciously thereto. The abrasive resistant coating preferably comprises a thermoset material taken from the group consisting of polysiloxane, acrylic resin or aliphatic polyurethane.

The relatively thick substrate layer 16 is preferably formed from thermoplastic material taken from the group consisting of polycarbonate, cyclic polyolefin and polymethyl methacrylate. The relatively thick substrate layer has a thickness within an operative range of 50 to 500 mils and a preferred range of from 100 to 150 mils. A preferred example of the thickness of the relatively thick substrate layer is approximately 125 mils.

Figure 2:
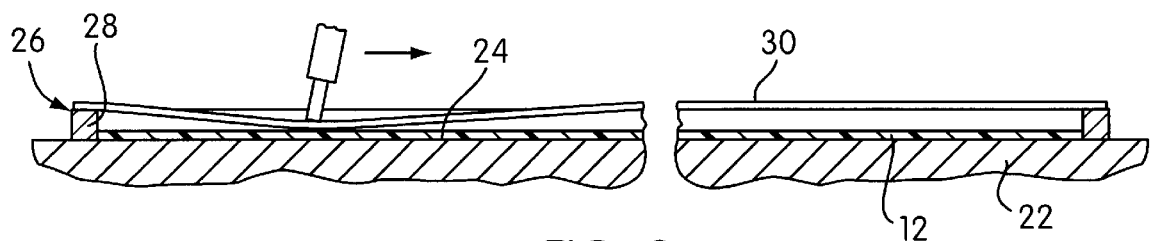
FIG. 2 is a generally schematic view illustrating a step in the process of making the window shown in FIG. 1.

FIG. 2 illustrates the preferred method of applying the electrically operable defrosting grid 14 to one surface of the relatively thin sheet 12. As shown, the relatively thin sheet 12 is mounted on a support 22 having a flat planar support surface 24. The thin sheet 12 is mounted on the flat surface 24 so as to be supported in a planar condition during the silk screening process. The silk screening itself is of a conventional nature and includes a silk screen assembly, generally indicated at 26, which includes a peripheral frame 28 and a silk screen 30 having openings formed therein which define the parallel wire elements 18 and buss bars 20 of the electrically operable defrosting grid 14. The silk screen 30 is loaded with an ink comprising an epoxy plastic material capable of being cured which is loaded with electrically conductive particles, such as silver particles. After the ink has been applied to the silk screen 30, a squeegee device 32 is moved over the silk screen so as to pass the ink on the silk screen through the openings thereof and deposit the same on the upper surface of the thin sheet 12. After both the wire elements 18 and buss bars 20 of the grid 14 have been applied to the surface of the relatively thin sheet 12, the applied ink is then cured in accordance with conventional practice by heating the same.

As previously indicated, the exterior of the relatively thin sheet 12 can also be silk screened to provide a black marginal edge also in accordance with conventional practice. This silk screening would be accomplished with the use of a different ink where the silver particles are replaced by carbon particles or the like.

It will be understood that while FIG. 2 illustrates the silk screening process to be accomplished while the thin sheet 12 is in a planar condition which is flat, it is within the contemplation of the present invention in the broadest aspects thereof to accomplish the silk screening procedure on a continuous web in which case the planar surface would be cylindrical.

Figure 3:
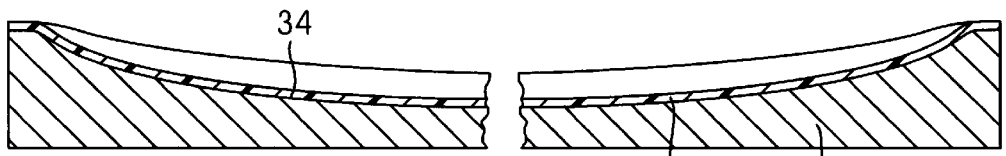
FIG. 3 is a view similar to FIG. 2 illustrating a further step in the method.

After the electrically operable defrosting grid has been applied and cured to the one surface of the thin sheet 12, the thin sheet 12 is then mounted within a molding die, such as shown at 32 in FIG. 3. The molding die 32 includes a curved die surface 34 and the thin sheet 12 is mounted with respect to the molding die 32 so that it is adjacent to the curved surface 34. As shown in FIG. 3, the curved surface may have curvature in two planes which is a prevalent practice with respect to motor vehicle type rear windows.

It is contemplated that the relatively thin sheet 12 has a thickness which when mounted in the molding die 32, would simply conform generally to the curved die surface 34. Preferably, the relatively thin sheet 12 is mounted within the molding die 32, adjacent the die surface 32 so that a marginal edge extends by and the dies surface 34. The outwardly extending marginal edge portion is engaged by a cooperating marginal edge of a second molding die 36 which cooperates with the molding die 32 when moved into cooperating relation with the die 32.

Figure 4:
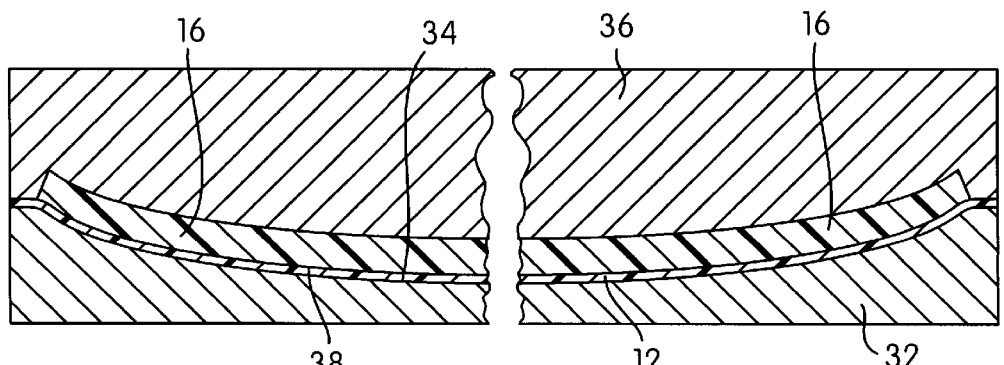
FIG. 4 is a view similar to FIG. 2 showing a still further step in the method of making the window of FIG. 1.

As best shown in FIG. 4, the cooperating molding die 36 includes a curved die surface 38 which is generally parallel with the curved die surface 34 of the molding die 32. The curved die surfaces 34 and 38 form a die cavity when the molding dies 32 and 36 are moved into cooperating relation. The die cavity has a thickness between the curved die surfaces 34 and 38 which is substantially greater than the thickness of the relatively thin sheet 12.

After the die members 32 and 36 have been moved into cooperating relation, the plastic material which is to form the substrate layer 16 is introduced into the die cavity above the marginally grip thin sheet 12 and injection molded under heat and pressure in accordance with conventional practice. During the injection molding the opposite surface of the relatively thin sheet is forced against the die surface 34 if it has not already been engaged therewith. If desired, the thin sheet 12 can be preformed to engaged the die surface 34 just before being mounted therein.

The resulting window 10 includes exterior surfaces which are curved to conform with the die surfaces 34 and 38. The electrically operable defrosting grid 14 is captured between the relatively thick substrate layer 16 and the relatively thin sheet 12 which now has a curvature corresponding to that of the substrate layer 16, retained by the adherence of the relatively thin sheet 12 to the substrate layer 16.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A method of forming a vehicle window having an electrically operable defrosting grid embodied therein comprising:

providing a relatively thin sheet of flexible clear plastic material having opposed surfaces, disposing said relatively thin sheet in a substantially planar condition, silk screening directly onto one surface of said relatively thin sheet while in said substantially planar condition a curable electrically conductive ink, said silk screening forming a plurality of parallel wire elements and buss bars interconnecting said wire elements to form a defrosting grid, curing the curable electrically conductive ink on the one surface of said relatively thin sheet so that the defrosting grid is stably adhered thereto, mounting the relatively thin sheet with the defrosting grid adhered to said one surface thereof on a first curved die surface of a first molding die so that said thin sheet conforms to a curvature of said first curved die surface, said first molding die arranged to cooperate with a second molding die having a similar shaped second curved die surface, disposing the first and second molding dies in cooperating relation to bring the first and second curved die surfaces into generally parallel relation to form a die cavity therebetween having a spacing substantially greater than the thickness of said relatively thin sheet of clear plastic material, injection molding while said relatively thin sheet is disposed in the die cavity a clear plastic material under heat and pressure within the die cavity between the first and second curved die surfaces to form a relatively thicker substrate layer of clear plastic material in comparison with said relatively thin sheet of clear plastic material, said relatively thicker substrate layer being molded directly onto said relatively thin sheet of clear plastic material in the die cavity and directly onto the cured electrically conductive ink forming said defrosting grid, said relatively thicker substrate layer being adhered to said one surface of said relatively thin sheet and the electrically operable defrosting grid cured thereto while in contact therewith in a molten state under heat and pressure within said die cavity by the two generally parallel curved die surfaces of the cooperating injection molding dies so that upon solidification the surfaces of said relatively thin sheet are retained in a curved configuration in generally parallel coextensive relation to corresponding curved surfaces of said relatively thick substrate layer, and said relatively thicker substrate layer of clear plastic material, said relatively thin sheet of clear plastic material, and said defrosting grid adhered to said one surface of said relatively thin sheet of clear plastic material together forming the vehicle window having curved exterior surfaces conforming to the fist and second curved die surfaces of said first and second molding dies.

2. A method as defined in claim 1 wherein an abrasive resistant material is coated on an opposite surface to said one surface of said relatively thin sheet, said opposite surface constituting an exterior surface of said vehicle window.

3. A method as defined in claim 1 wherein said abrasive resistant material is a thermoset material taken from the group consisting of polysiloxane, acrylic resin or aliphatic polyurethane.

4. A method as defined in claim 1 wherein said relatively thin sheet has a thickness within a range of 5–40 mils.

5. A method as defined in claim 1 wherein said relatively thin sheet has a thickness within a range of 10–30 mils.

6. A method as defined in claim 1 wherein said relatively thin sheet has a thickness of approximately 20 mils.

7. A method as defined in claim 1 wherein said relatively thin sheet is formed from a thermoplastic material selected from the group consisting of polycarbonate and polyester resin.

8. A method as defined in claim 1, wherein said relatively thicker substrate layer has a thickness within a range of 50–500 mils.

9. A method as defmed in claim 1, wherein said relatively thicker substrate layer has a thickness within a range of 100–150 mils.

10. A method as defmed in claim 1 wherein said relatively thicker substrate layer has a thickness of approximately 125 mils.

11. A method as defined in claim 1 wherein said relatively thicker substrate layer is formed of a thermoplastic material selected from the group consisting of polycarbonate, cyclic polyolefin, and polymethylmethacrylate.

* * * * *